United States Patent
Tao et al.

(10) Patent No.: US 12,067,055 B2
(45) Date of Patent: Aug. 20, 2024

(54) INFORMATION DISPLAY METHOD AND ELECTRONIC APPARATUS

(71) Applicant: Lenovo (Beijing) Limited, Beijing (CN)

(72) Inventors: Jiaming Tao, Beijing (CN); Yingwen Luo, Beijing (CN)

(73) Assignee: LENOVO (BEIJING) LIMITED, Beijing (CN)

(*) Notice: Subject to any disclaimer, the term of this patent is extended or adjusted under 35 U.S.C. 154(b) by 0 days.

(21) Appl. No.: 18/179,107

(22) Filed: Mar. 6, 2023

(65) Prior Publication Data
US 2023/0297618 A1    Sep. 21, 2023

(30) Foreign Application Priority Data
Mar. 16, 2022   (CN) .......................... 202210259480.8

(51) Int. Cl.
*G06F 16/00*  (2019.01)
*G06F 16/738*  (2019.01)
*G06F 16/78*  (2019.01)
*G06F 16/783*  (2019.01)

(52) U.S. Cl.
CPC ........ *G06F 16/7867* (2019.01); *G06F 16/738* (2019.01); *G06F 16/7844* (2019.01)

(58) Field of Classification Search
CPC ............. G06F 16/7867; G06F 16/7844; G06F 16/738
See application file for complete search history.

(56) References Cited

U.S. PATENT DOCUMENTS

2013/0004138 A1* 1/2013 Kilar .................. H04N 21/8455
                                                      386/230
2013/0290859 A1* 10/2013 Venkitaraman ...... H04N 21/854
                                                      715/744

* cited by examiner

*Primary Examiner* — Thu Nguyet T Le
(74) *Attorney, Agent, or Firm* — ANOVA LAW GROUP, PLLC

(57) ABSTRACT

An information display method includes receiving a comment display instruction triggered by a user operation and determining key information involved in a video, determining a target comment according to the key information and existing comments of the video, and displaying the target comment according to a target display mode. The key information is key information involved in a first time period of the video.

20 Claims, 4 Drawing Sheets

S101 — Receive a comment display instruction triggered by a user operation and determine key information involved in the video, the key information being involved in the video content of the first time period S102 — Determine a target comment according to the key information and existing comments of the video S103 — Display the target comment according to a target display mode 18367 Comments aaaaa
What is Sabies Mites?

Responded bbbbb
Sarcoptes scabiei

Responded ccsnz
Itch mites

Responded

Zhou
hominis

Responded

More ∨  Fold ∧

Qian
I have Sabies Mites. I have not recovered after taking the medication for a month.

Sabies Mites is Sarcoptidae, a permanent mite type. Once the people touches it, the mite can live on the skin of the people and animals to cause itching and skin dIsease, that is Scabies. The Sabies lives on the human body is Sarcoptes scabies.

INFORMATION DISPLAY METHOD AND ELECTRONIC APPARATUS

CROSS-REFERENCE TO RELATED APPLICATION

This application claims priority to Chinese Patent Application No. 202210259480.8, filed on Mar. 16, 2022, the entire content of which is incorporated herein by reference.

TECHNICAL FIELD

The present disclosure relates to the information processing technology field and, more particularly, to an information display method and an electronic apparatus.

BACKGROUND

On the internet, a user can watch various types of videos and publish a comment in a comment area while the user watches a video. Comments published by users in the comment area are arranged according to a time sequence when the users publish the comments or according to the popularity of discussion topics. If a length of the video is short, or a number of topics commented for the video is small, the user can quickly find the comment that the user wants. However, if the length of the video is long, and the number of comments and the number of topics are large, the user needs to spend a long time scrolling in the comment area to find the comment that the user wants.

SUMMARY

Embodiments of the present disclosure provide an information display method. The method includes receiving a comment display instruction triggered by a user operation and determining key information involved in a video, determining a target comment according to the key information and existing comments of the video, and displaying the target comment according to a target display mode. The key information is involved in a first time period of the video.

Embodiments of the present disclosure provide an electronic device, including a processor and a memory. The memory is communicatively coupled to the processor and stores instructions that, when executed by the processor, cause the processor to receive a comment display instruction triggered by a user operation and determine key information involved in a video, determine a target comment according to the key information and existing comments of the video, and display the target comment according to a target display mode. The key information is involved in a first time period of the video.

Embodiments of the present disclosure provide a non-transitory computer-readable storage medium storing a computer program that, when executed by a processor, causes the processor to receive a comment display instruction triggered by a user operation and determining key information involved in a video, determine a target comment according to the key information and existing comments of the video, and display the target comment according to a target display mode. The key information is involved in a first time period of the video.

DETAILED DESCRIPTION OF THE EMBODIMENTS

To make the objects, technical solutions, and advantages of embodiments of the present disclosure clearer, the technical solutions of embodiments of the present disclosure are described in detail below with reference to the accompanying drawings of embodiments of the present disclosure. The described embodiments are some embodiments of the present disclosure not all embodiments. Based on embodiments of the present disclosure, all other embodiments obtained by those skilled in the art without creative effort are within the scope of the present disclosure.

Due to the rapid development of networks, contents of some videos may not be familiar to all users. Normally, a user can search in a comment area to see if a related thing is discussed by someone. If no related thing is discussed, the user can search a related content on the Internet. For example, if someone mentioned "this is really YYDS," and the user does not know the meaning of "YYDS," the user can open the comment area to search if someone explains the meaning of "YYDS" in the comment area.

In the related technology, a sequence of comments published by all the users in the comment area can be arranged according to a time sequence of the comments published by the users or according to popularity of discussion topics. Due to these two types of comment arrangement manners, the user cannot quickly find comments or topics corresponding to the content currently involved in the video in the comment area.

Figure 1:
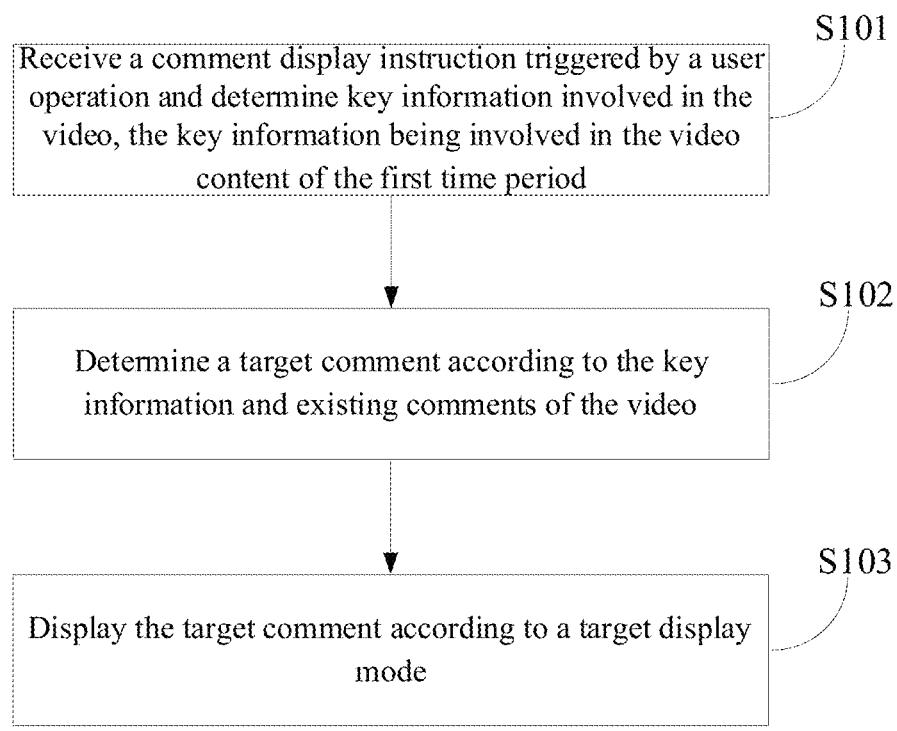
FIG. 1 illustrates a schematic flowchart of an information display method according to some embodiments of the present disclosure.

Thus, embodiments of the present disclosure provide an information display method, which can be applied to a scene in which the user wants to quickly find a target comment involved in video content of a first time period when a video is played by an electronic apparatus. As shown in FIG. 1, the information display method includes the following processes.

At S101, a comment display instruction triggered by a user operation is received, and key information involved in the video is determined. The key information is involved in the video content of the first time period.

In embodiments of the present disclosure, the electronic apparatus can include a display screen. The electronic apparatus can display the video through the display screen. When the user watches a video, the content in the video may not be familiar to the user, or the user is interested in the content in the video, the user can operate to trigger the display of the comment that the user wants to view. The comment related to the content in the video can be the comment that the user wants to find. The user can trigger to generate the comment display instruction in a variety of manners. For example, the user can click a comment area expansion/folding functional key to trigger to generate the comment display instruction. For another example, the user can double-click on the video to trigger to generate the comment display instruction. For another example, the user can click to modify/publish the comment and trigger the comment display instruction.

In some embodiments, since the video playing is a continuous process, and the user is interested in or unfamiliar with the content in the video mentioned in a time period, the current time of the user operation triggering the comment display instruction is received to determine the time period, i.e., the first time period. Then, the key information involved in the video content of the first time period can be determined to obtain the key information involved in the video.

In some embodiments, the first time period can be several seconds or ten seconds before, several seconds or ten seconds after, and several seconds or ten seconds before and after the current time.

In some embodiments, the key information can include a keyword of the content mentioned in the video content of the first time period. For example, if someone mentions "this is very YYDS" in the video content of the first time period, a keyword "YYDS" can be extracted from "this is YYDS." Thus, "YYDS" can be the key information involved in the video content of the first time period. For example, if someone mentions "Reign of Zhenguan is the most prosperous time of the Tang dynasty" in the video content of the first time period, "Reign of Zhenguan" can be extracted as a keyword from "Reign of Zhenguan is the most prosperous time of the Tang dynasty." Thus, "Reign of Zhenguan" can be the key information involved in the video content of the first time period.

At S102, a target comment is determined according to the key information and existing comments of the video.

In embodiments of the present disclosure, the existing comments of the video can be saved according to the posting time of the comments or the popularity of the topic, which is not limited here.

In some embodiments, determining the target comment according to the key information and the existing comments of the video can include extracting a comment including the key information from the existing comments of the video to obtain the target comment.

Since the comment or topic related to the key information that discusses the key information generally includes the key information, the comment including the key information can be extracted from the existing comments of the video to quickly and directly obtain the target comment.

At S103, the target comment is displayed according to a target display mode.

In embodiments of the present disclosure, target comments can be sorted or classified according to the popularity of the topic, the posting time of the comments, and a data size of each comment. The sorted or classified comments can be displayed in the comment area or over the video in a floating manner. Thus, the user may not need to search the target comment from the large quantity of existing comments of the video.

Figure 2:
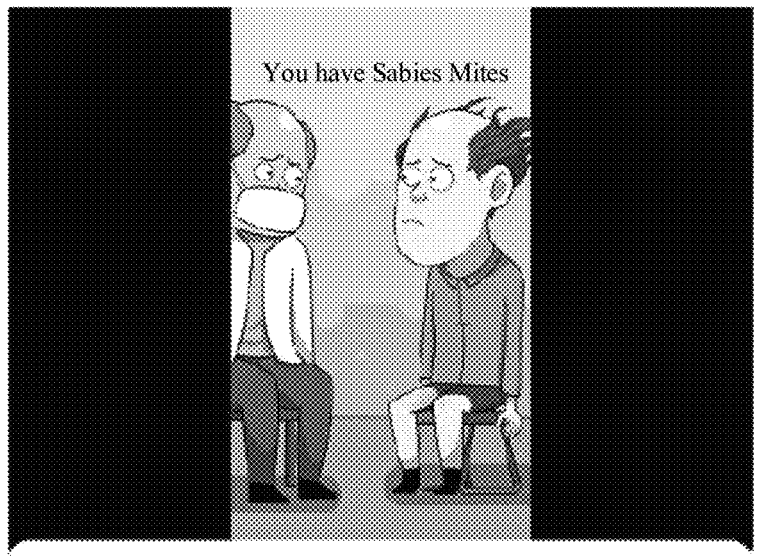
FIG. 2 illustrates a schematic diagram showing displaying a target comment at a comment area according to some embodiments of the present disclosure.

For example, in the video content of the first time period, someone can mention "this is really YYDS." When the user clicks the comment area expansion/folding functional key, comments and topics about YYDS in the comment area can be filtered and displayed. When someone mentions "Reign of Zhenguan is the most prosperous time of the Tang dynasty," and the user clicks on the comment area expansion/folding functional key, comments and topics about "Reign of Zhenguan" can be filtered and displayed. For another example, when someone says "you have scabies mites" in the video, and the user clicks on the comment area expansion/folding functional key, as shown in FIG. 2, comments and topics about the scabies mites in the comment area are all filtered and displayed. If the user drags a video progress bar, the displayed content of the comment area can be dynamically changed.

In the information display method of embodiments of the present disclosure, by receiving the comment display instruction triggered by the user operation, the key information involved in the video can be determined. The key information can be involved in the video content of the first time period. The target comment can be determined according to the key information and the existing comments of the video. The target comment can be displayed in the target display mode. Thus, during watching a variety of videos, no matter in which position of the video the user watches, when the user opens the comment area and wants to search the comments or topics related to the key information in the video content of the current position, the comments and topics related to the key information can be automatically filtered from all the comments in the comment area. The comments and topics related to the key information can be displayed in the target display mode. Thus, the user can quickly find the comments and topics related to the key information in the video content of the current position, which can greatly improve the viewing experience of the user.

In some embodiments, in process S101, determining the key information involved in the video, the key information being involved in the video content of the first time period, can include searching the key information involved in the video content of the first time period in a mapping table of a predetermined time period and the key information.

In embodiments of the present disclosure, the key information involved in the video content of the first time period can be extracted in a pre-extraction manner.

In some embodiments, when the video is uploaded to a system or a server, the video can be parsed to extract text information involved in the video content of each time period. The text information involved in the video content of each time period can include text information displayed in the video and/or text information corresponding to a voice in the video. The text information displayed in the video can include Chinese and English subtitles, characters in the video picture, etc. The text information corresponding to the voice in the video can include characters obtained by parsing the voice of the video. After the text information involved in the video content of each time period is extracted, a keyword of the text information can be extracted in a keyword extraction manner to obtain the key information involved in the video content of each time period. Then, a mapping relationship can be formed between the key information and the time period and saved to obtain the mapping table of the time period and the key information. When the comment display instruction triggered by the user operation is received, and after the first time period corresponding to the current time is determined, the key information corresponding to the first time period can be searched from the mapping table.

In embodiments of the present disclosure, by predetermining the mapping table of the time period and the key information, when the key information involved in the video content of the first time period is determined, the key information may not need to be extracted in real-time. Thus, time for parsing the video can be saved to quickly obtain the key information involved in the video content of the first time period.

In some embodiments, in process S101, determining the key information involved in the video, the key information being in the video content of the first time period can include obtaining the text information involved in the video content of the first time period and extracting at least one target text from the text information to obtain the key information.

In embodiments of the present disclosure, the key information involved in the video content of the first time period can be extracted in a real-time extraction manner.

In some embodiments, the textual information involved in the video content of the first time period can include text information displayed in the video content of the first time period and/or text information corresponding to the voice in the video content of the first time period. The text information displayed in the video can include Chinese and English subtitles, characters in the video picture, etc. The text information corresponding to the voice in the video can include the characters obtained by parsing the voice in the video.

In some embodiments, the target text can include the keyword. One or more target texts can be included.

In embodiments of the present disclosure, during playing the video, if the user operation triggers the comment display instruction, for example, when the user clicks on the comment expansion and/or folding functional key to trigger the comment area to be expanded, the text information involved in the video content of the current time and two or three seconds before the current time can be dynamically identified. Then, the keyword can be extracted from the text information to obtain the key information.

For example, a current frame image at the current time and previous frame images corresponding to the two or three second time period before the current time can be obtained. The current frame image and the previous frame images can be parsed to obtain characters corresponding to voices in the current frame image and the previous frame images, subtitles in the current frame image and the previous frame images, and other characters except for the subtitles in the current frame image and the previous frame images. Then, the characters, the subtitles, and the other characters corresponding to the voices can be summarized to extract the keyword to obtain the key information involved in the videos of the current time and the two or three second time period before the current time.

In embodiments of the present disclosure, the text information involved in the video content of the first time period can be obtained. At least one target text can be extracted from the text information to obtain the key information. Thus, the key information can be extracted from the video in real-time.

In some embodiments, the information display method further includes the following processes.

At S104, if the comment including the key information is not extracted from the existing comments of the video, a data acquisition request is sent to a target server according to the comment display instruction to obtain information related to the key information.

Figure 3:
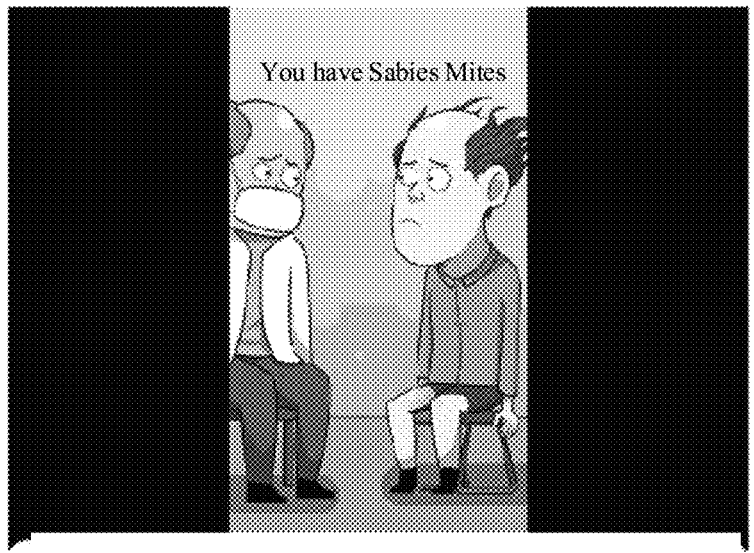
FIG. 3 illustrates a schematic diagram showing displaying a feedback result of a target server at a comment area according to some embodiments of the present disclosure.

In some embodiments, if the time when the user watches the video is early, or other users do not comment on the key information involved in the video, no comment including the key information can be extracted from existing comments of the video. Then, the data acquisition request can be sent to the target server, such as a search engine server, to request to obtain related content about the key information. As shown in FIG. 3, a feedback result is displayed in the comment area or over the video in the floating manner. In some other embodiments, a search engine search page can be opened, and the feedback result can be displayed on the search page.

In embodiments of the present disclosure, when no comment content including the key information is extracted from the existing comments of the video, the data acquisition request can be sent to the target server in real-time to obtain the content related to the key information from the target server. A need that the user wants to know the related content of the key information can be satisfied to improve the user experience.

In some embodiments, in process S103, displaying the target comment according to the target display manner can include sorting the target comment according to a predetermined rule and displaying the target comment according to the sequence of the sorted target comment.

In some embodiments, since the key information involved in the video content of the first period can include a plurality of keywords, a comment corresponding to each keyword can be obtained from the existing comments of the video. The predetermined rule can include that a topic with the largest popularity can be sorted in the front, a comment with an early posting time can be sorted in the front, a comment with a largest data size (most important) can be sorted in the front, a comment corresponding to a complicated keyword can be sorted in the front. Sorting the target content according to the predetermined rule can include sorting comments corresponding to different keywords, sorting topics with different popularities corresponding to the same keyword, and sorting important degrees of the comments corresponding to the same keyword.

After the target comments are sorted, the target comments can be displayed in the comment area or over the video in the floating manner according to the sequence of the sorted target comments.

In the embodiments of the present disclosure, by sorting the target comments, and then displaying the comments, an important comment can be displayed with priority, which is beneficial for the user to search for the comment desired by the user.

In some embodiments, in process S103, displaying the target comment according to the target display mode can include determining a display data volume corresponding to the comment display area, and generating page data according to the display data volume and the target comment. The page data can include a page identifier. The process can further include obtaining a current page identifier corresponding to a current comment display area, obtaining target page data corresponding to the current page identifier from the page data, and displaying the target page data.

In some embodiments, if the data size of the target comment corresponding to the key information involved in the video content of the first time period is relatively large, and the number of comments that can be displayed in the comment display area are limited, the target comment can be divided into pages according to the data amount that the comment display area can display, e.g., a maximum number of comments that can be displayed, to generate a page identifier, such as 1, 2, 3, etc. When the user clicks on the comment expansion and/or folding functional key to trigger the comment area to be expanded, target comments on a page 1 can be rendered. Then, the rendered target comments on the first page can be displayed in the current comment area. When the user drags a scrolling bar of the comment display area or turns the page of the comment display area, the page identifier of the current page corresponding to the current comment display area can be identified, e.g., 2. Then, target comments on a page 2 can be obtained. Then, the target comments on page 2 can be rendered, and the rendered target comments on page 2 can be displayed in the current comment display area.

In some embodiments, when the page data is generated according to the display data volume and the target comments, the target comments can be sorted first according to the predetermined rule. The predetermined rule can include, for example, sorting the topic with the largest popularity in the front, sorting the comment with the earliest posting time in the front, sorting the comment with the largest data volume (most important) in the front, and sorting the comment corresponding to the more difficult keyword in the front.

In embodiments of the present disclosure, by generating the page data from the target comments, when the target comments are displayed, not all the target comments need to be rendered. Only target comments of a page that is displayed can be rendered, which improves the display speed of the target comments to improve the user experience.

In some embodiments, the information display method can further include obtaining neighboring page data corresponding to the target page data, rendering the neighboring page data, receiving a context display instruction triggered by the user operation, and displaying the rendered neighboring page data.

In some embodiments, during turning the page for the target comments in the comment display area, to improve a display speed of the context target comments during page turning, page data of page 2 can be obtained when the target page data of the current page is displayed, e.g., page 1. Then, the page data of page 2 can be rendered. Thus, when the user operation is received, e.g., a page-turning operation, to trigger the context display instruction, the rendered page data on page 2 can be displayed to improve the display speed of the page data on page 2 to improve the user experience.

Figure 4:
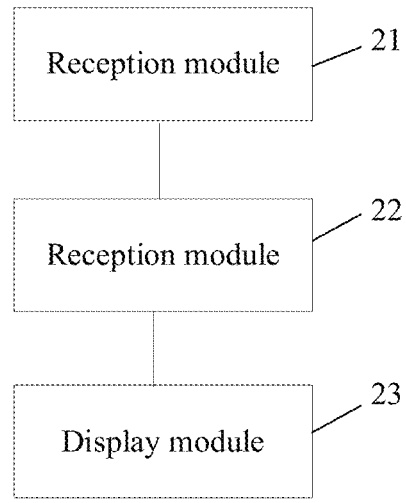
FIG. 4 illustrates a schematic structural diagram of an information display device according to some embodiments of the present disclosure.

Embodiments of the present disclosure provide an information display device. As shown in FIG. 4, the device includes a reception module 21, a determination module 22, and a display module 23.

The reception module 21 can be configured to receive the comment display instruction triggered by the user operation and determine the key information involved in the video. The key information can be involved in the video content of the first time period.

The determination module 22 can be configured to determine the target comment according to the key information and the existing comments of the video.

The display module 23 can be configured to display the target comment according to the target display mode.

In the information display device of embodiments of the present disclosure, by receiving the comment display instruction triggered by the user operation, the key information involved in the video can be determined. The key information can be involved in the video content of the first time period. The target comment can be determined according to the key information and the existing comments of the video. The target comment can be displayed in the target display mode. Thus, during watching the variety of videos, no matter in which position of the video the user watches, when the user opens the comment area and wants to search the comments or topics related to the key information in the video content of the current position, the comments and topics related to the key information can be automatically filtered from all the comments in the comment area. The comments and topics related to the key information can be displayed in the target display mode. Thus, the user can quickly find the comments and topics related to the key information in the video content of the current position, which can greatly improve the viewing experience of the user.

In some embodiments, the reception module 21 can be configured to search for the key information involved in the video content of the first time period from the mapping table of the predetermined time period and the key information.

In some other embodiments, the reception module 21 can be configured to obtain the text information involved in the video content of the first time period and extract the at least one target text from the text information to obtain the key information.

In some other embodiments, the text information involved in the video content of the first time period can include the text information displayed in the video content of the first time period and/or the text information corresponding to the voice in the video content of the first time period.

In some other embodiments, the determination module 22 can be configured to extract the comment including the key information from the existing comments of the video to obtain the target comment.

In some embodiments, the information display device can further include a transmission module 24 configured to send the data acquisition request to the target server according to the comment display instruction to obtain the information related to the key information if the comment including the key information is not extracted from the existing comments of the video.

In some embodiments, the display module 23 can be configured to sort the target comments according to the predetermined rule and display the target comments according to the sequence of the sorted target comments.

In some embodiments, the display module 23 can be configured to determine the display data volume corresponding to the comment display area, generate the page data according to the display data volume and the target comment, the page data including the page identifier, obtain the current page identifier corresponding to the current comment display area, obtain the target page data corresponding to the current page identifier from the page data, and display the target page data.

In some embodiments, the information display device can further include an acquisition module 25. The acquisition module 25 can be configured to obtain the neighboring page data corresponding to the target page data, render the neighboring page data, and receiving the context display instruction triggered by the user operation, and display the rendered neighboring page data.

Based on a same concept as the information display method above, embodiments of the present disclosure further provide an electronic apparatus. An exemplary application of the electronic apparatus of embodiments of the present disclosure is described below. The electronic apparatus of embodiments of the present disclosure can include an electronic apparatus, such as a server or a terminal apparatus.

The server can be an independent physical server, a server cluster or a distributed system formed by a plurality of physical servers, or a cloud server providing cloud computing services. The terminal apparatus can include, but is not limited to, a smartphone, a tablet, a laptop computer, a desktop computer, a smart speaker, a smartwatch, etc. The terminal apparatus and the server can be directly or indirectly connected through wired or wireless communication, which is not limited in the present disclosure.

Figure 5:
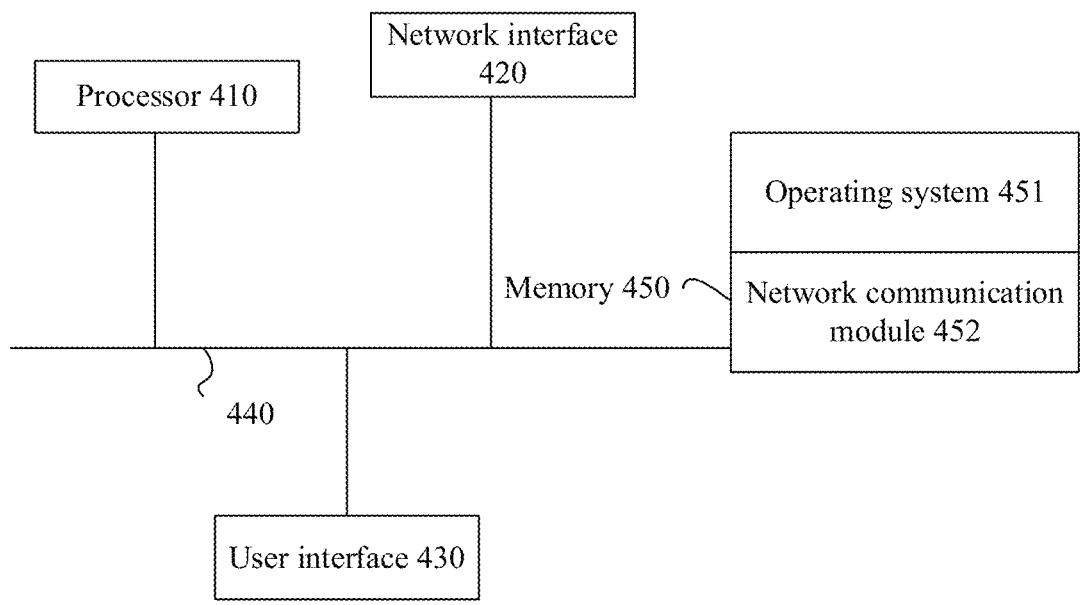
FIG. 5 illustrates a schematic structural diagram of an electronic apparatus according to some embodiments of the present disclosure.

FIG. 5 illustrates a schematic structural diagram of an electronic apparatus 400 according to some embodiments of the present disclosure. The electronic apparatus 400 shown in FIG. 5 includes at least one processor 410, a memory 450, and a bus 440. Various assemblies of the electronic apparatus 400 are coupled together through the bus 440. The bus 440 can be used to enable communications among the assemblies. The bus 440 can include a power bus, a control bus, and a status signal bus in addition to a data bus. For clarity of illustration, the various busses are labeled as the bus 440 in FIG. 5.

The processor 410 can be an integrated circuit chip having a signal processing capability, e.g., a general-purpose processor, a digital signal processor (DSP), or another programmable logic device, discrete gate or transistor logic device, discrete hardware assembly, etc. The general-purpose processor can include a microprocessor or any conventional processor.

The memory 450 can store executable instructions for implementing the information display method of embodiments of the present disclosure. The information display method is implemented by the processor 410 of the electronic apparatus shown in FIG. 5. The memory 450 can be removable, non-removable, or a combination thereof. An exemplary hardware device can include a solid-state memory, a hard disk drive, an optical disk drive, etc. In some embodiments, the memory 450 can include one or more storage apparatuses physically located away from the processor 410.

In some embodiments, the memory 450 can store data to support various operations. An example of the data can include a program, a module, a data structure, or a subset or superset thereof.

In some embodiments, the electronic apparatus 400 can further include an operating system 451 and a network communication module 452.

The operating system 451 can include a system program for handling various basic system services and performing hardware-related tasks, e.g., a framework layer, a core library layer, a driver layer, etc. The operating system 451 can be configured to implement various basic services and handle a hardware-based task.

The network communication module 452 can be configured to reach another computer apparatus via one or more (wired or wireless) network interface 420. An exemplary network interface 420 can include Bluetooth, wireless compatibility authentication (WiFi), and universal serial bus (USB).

Embodiments of the present disclosure provide a computer-readable storage medium storing executable instructions that, when executed by the processor, cause the processor to perform the information display method of embodiments of the present disclosure, for example, the information display method shown in FIG. 1.

In some embodiments, the computer-readable storage medium can include a memory such as FRAM, ROM, PROM, EPROM, EEPROM, flash, magnetic surface memory, optical disk, or CD-ROM, or various apparatuses including one or any combination thereof.

In some embodiments, the executable instructions can be written in any form of programming language (including compiled or interpreted languages) in a form of a program, a software module, a script, or codes, and can be deployed in any form, including as a stand-alone program or as a module, assembly, subroutine, or another unit suitable for use in a computing environment.

For example, the executable instructions can be deployed and executed on one computer apparatus or on a plurality of computer apparatuses at one place or distributed across a plurality of places and interconnected by a communication network.

Embodiments of the present disclosure provide a computer program product. The computer program can include a computer program/instruction. When the computer program/instruction is executed by the processor, a resource management method of the present disclosure can be implemented.

Those skilled in the art should understand that embodiments of the present disclosure can be provided as a method, a system, or a computer program product. Thus, the present disclosure can be implemented in the form of a hardware embodiment, a software embodiment, or an embodiment combining software and hardware aspects. Furthermore, in the present disclosure, the computer program product can be implemented in one or more computer-usable storage medium (including, but not limited to, disk storage, CD-ROM, and optical storage) including the computer-usable program codes.

The present disclosure is described with reference to the flowchart and/or block diagram of the method, the apparatus (system), and the computer program product according to embodiments of the present disclosure. Each flow and/or block of the flow diagram and/or block diagram and a combination of the flow and/or block of the flow diagram and/or block diagram can be implemented by the computer program instructions. These computer program instructions can be provided to a general-purpose computer, a special-purpose computer, an embedded processor, or another programmable information processing apparatus to produce a machine. Thus, the instructions, which are executed by the processor of the computer or another programmable information processing apparatus, can produce a device configured to implement a determined function of one or more flows of the flowchart and/or one or more blocks of the block diagram.

These computer program instructions can also be stored in computer-readable memory that can direct a computer or another programmable information processing apparatus to function in a particular manner. Thus, the instructions stored in the computer-readable memory can produce a manufactured article including the instruction device. The instruction device can be configured to implement the determined function of one or more flows of the flowchart and/or one or more blocks of the block diagram.

These computer program instructions can also be loaded onto a computer or another programmable information processing apparatus to execute a series of operational steps on the computer or another programmable apparatus to produce the processes implemented by the computer. Thus, the instructions executed in the computer or the another programmable apparatus can be used to provide the steps for implementing the determined functions of one or more flows of the flowchart and/or one or more blocks of the block diagram.

Those skilled in the art can perform various changes and modifications to the present disclosure without departing from the spirit and scope of the present disclosure. Thus, if the modifications and variations of the present disclosure are within the scope of the claims of the present disclosure and their equivalents, the present disclosure is intended to include the modifications and variations as well.

What is claimed is:

1. An information display method comprising:
receiving, by a processor connected to a display and while the display is displaying a video, a comment display instruction triggered by a user operation; and
in response to receiving the comment display instruction, automatically controlling, by the processor, the display to display at least one target comment related to a video content of the video that is displayed by the display when the comment display instruction is received, wherein automatically controlling the display to display the at least one target comment includes:
determining key information involved in a first time period of the video, the first time period being determined based on a time point at which the comment display instruction is received, and the key information being extracted from at least one of first text information displayed in the first time period of the video or second text information corresponding to a voice in the first time period of the video;
determining the at least one target comment according to the key information and existing comments of the video; and
automatically controlling the display to display the at least one target comment according to a target display mode.

2. The information display method according to claim 1, wherein determining the key information involved in the video, the key information being involved in the first time period of the video includes:
searching for the key information involved in the first time period of the video from a mapping table of a predetermined time period and the key information.

3. The information display method according to claim 1, wherein the determining the key information involved in the video, the key information being involved in the first time period of the video includes:
obtaining text information including at least one of the first text information or the second text information involved in the first time period of the video; and
extracting at least one target text from the text information to obtain the key information.

4. The information display method according to claim 1, wherein determining the at least one target comment according to the key information and the existing comments of the video includes:
extracting a comment including the key information from the existing comments of the video to obtain the at least one target comment.

5. The information display method according to claim 4, further comprising:
in response to the comment including the key information being not extracted from the existing comments of the video, sending a data acquisition request to a target server according to the comment display instruction to obtain information related to the key information.

6. The information display method according to claim 1, wherein displaying the at least one target comment according to the target display mode includes:
sorting the at least one target comment according to a predetermined rule; and
displaying the at least one target comment according to a sequence of the sorted target comment.

7. The information display method according to claim 1, wherein displaying the at least one target comment according to the target display mode includes:
determining a display data volume corresponding to a comment display area;
generating page data according to the display data volume and the at least one target comment, the page data including a page identifier;
obtaining a current page identifier corresponding to a current comment display area;
obtaining target page data corresponding to the current page identifier from the page data; and
displaying the target page data.

8. The information display method according to claim 7, further comprising:
obtaining neighboring page data corresponding to the target page data;
rendering the neighboring page data; and
receiving a context display instruction triggered by a user operation and displaying the rendered neighboring page data.

9. The information display method according to claim 1, further comprising:
sorting the at least one target comment according to at least one of an important degree or a popularity of the at least one target comment; and
displaying the at least one target comment according to a sequence of the sorted target comment.

10. An electronic device, comprising:
a processor; and
a memory communicatively coupled to the processor and storing instructions that, when executed by the processor, cause the processor to:
receive, while a display connected to the processor is displaying a video, a comment display instruction triggered by a user operation; and
in response to receiving the comment display instruction, automatically control the display to display at least one target comment related to a video content of the video that is displayed by the display when the comment display instruction is received, wherein automatically controlling the display to display the at least one target comment includes:
determining key information involved in a first time period of the video, the first time period being determined based on a time point at which the comment display instruction is received, and the key information being extracted from at least one of first text information displayed in the first time period of the video or second text information corresponding to a voice in the first time period of the video;
determining the at least one target comment according to the key information and existing comments of the video; and
automatically controlling the display to display the at least one target comment according to a target display mode.

11. The device according to claim 10, wherein the processor is further configured to:
search for the key information involved in the first time period of the video from a mapping table of a predetermined time period and the key information.

12. The device according to claim 10, wherein the processor is further configured to:
obtain text information including at least one of the first text information or the second text information involved in the first time period of the video; and
extract at least one target text from the text information to obtain the key information.

13. The device according to claim 12, wherein the text information involved in the first period of the video includes:
   text information displayed in the first time period of the video and/or text information corresponding to a voice in the first time period of the video.

14. The device according to claim 10, wherein the processor is further configured to:
   extract a comment including the key information from the existing comments of the video to obtain the at least one target comment.

15. The device according to claim 14, wherein the processor is further configured to:
   in response to the comment including the key information being not extracted from the existing comments of the video, send a data acquisition request to a target server according to the comment display instruction to obtain information related to the key information.

16. The device according to claim 10, wherein the processor is further configured to:
   sort the at least one target comment according to a predetermined rule; and
   display the at least one target comment according to a sequence of the sorted target comment.

17. The device according to claim 10, wherein the processor is further configured to;
   determine a display data volume corresponding to a comment display area;
   generate page data according to the display data volume and the at least one target comment, the page data including a page identifier;
   obtain a current page identifier corresponding to a current comment display area;
   obtain target page data corresponding to the current page identifier from the page data; and
   display the target page data.

18. The device according to claim 17, wherein the processor is further configured to:
   obtain neighboring page data corresponding to the target page data;
   render the neighboring page data; and
   receive a context display instruction triggered by a user operation and displaying the rendered neighboring page data.

19. A non-transitory computer-readable storage medium storing a computer program that, when executed by a processor, causes the processor to:
   receive, while a display connected to the processor is displaying a video, a comment display instruction triggered by a user operation; and
   in response to receiving the comment display instruction, automatically control the display to display at least one target comment related to a video content of the video that is displayed by the display when the comment display instruction is received, wherein automatically controlling the display to display the at least one target comment includes:
      determining key information involved in a first time period of the video, the first time period being determined based on a time point at which the comment display instruction is received, and the key information being extracted from at least one of first text information displayed in the first time period of the video or second text information corresponding to a voice in the first time period of the video;
      determining the at least one target comment according to the key information and existing comments of the video; and
      automatically controlling the display to display the at least one target comment according to a target display mode.

20. The storage medium according to claim 19, wherein the processor is further configured to:
   search for the key information involved in the first time period of the video from a mapping table of a predetermined time period and the key information.

* * * * *